US012678691B2

(12) United States Patent
Hao et al.

(10) Patent No.: US 12,678,691 B2
(45) Date of Patent: ***Jul. 14, 2026

(54) VIEWING ANGLE ADJUSTMENT METHOD AND DEVICE, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Yi Hao, Shenzhen (CN); Zhe Zhou, Shenzhen (CN); Shuohuan Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 62 days.

This patent is subject to a terminal disclaimer.

(21) Appl. No.: 18/613,349

(22) Filed: Mar. 22, 2024

(65) Prior Publication Data

US 2024/0269555 A1 Aug. 15, 2024

Related U.S. Application Data

(63) Continuation of application No. 16/878,866, filed on May 20, 2020, now Pat. No. 11,977,713, which is a
(Continued)

(30) Foreign Application Priority Data

Feb. 9, 2018 (CN) .......................... 201810136918.7

(51) Int. Cl.
*A63F 13/00* (2014.01)
*A63F 13/525* (2014.01)
(Continued)

(52) U.S. Cl.
CPC ............ *A63F 13/53* (2014.09); *A63F 13/525* (2014.09); *A63F 13/577* (2014.09); *A63F 13/837* (2014.09); *G06F 3/04812* (2013.01)

(58) Field of Classification Search
CPC .. A63F 13/426; A63F 13/525; A63F 13/5252; A63F 13/5255; A63F 13/5258;
(Continued)

(56) References Cited

U.S. PATENT DOCUMENTS

| | | | |
|---|---|---|---|
| 7,753,785 | B2 | 7/2010 | Nishimura |
| 9,770,664 | B2 | 9/2017 | Jo et al. |

(Continued)

FOREIGN PATENT DOCUMENTS

| | | |
|---|---|---|
| CN | 204502378 U | 7/2015 |
| CN | 105498213 A | 4/2016 |

(Continued)

OTHER PUBLICATIONS

International Search Report and Written Opinion dated Apr. 28, 2019 for PCT Application No. PCT/CN2019/074131, 11 pages.
(Continued)

*Primary Examiner* — Justin L Myhr
(74) *Attorney, Agent, or Firm* — Crowell & Moring LLP

(57) ABSTRACT

The present disclosure provides a viewing angle adjustment method and device, an electronic device, and a non-transitory computer-readable storage medium, and belongs to the field of computer technologies. The method includes determining an adsorption area of a first virtual object in a virtual scenario according to a distance between the first virtual object and a second virtual object, a size of the adsorption area being positively correlated with the distance between the first virtual object and a second virtual object. In response to an aiming point of the second virtual object being located in the adsorption area, the method includes
(Continued)

obtaining a target rotation speed of a viewing angle of the virtual scenario. The method also includes adjusting the viewing angle of the virtual scenario according to the target rotation speed of the viewing angle.

20 Claims, 5 Drawing Sheets

Related U.S. Application Data continuation of application No. PCT/CN2019/074131, filed on Jan. 31, 2019.

(51) Int. Cl.
| | | |
|---|---|---|
| *A63F 13/53* | (2014.01) | |
| *A63F 13/577* | (2014.01) | |
| *A63F 13/837* | (2014.01) | |
| *G06F 3/04812* | (2022.01) | |

(58) Field of Classification Search
CPC ................. A63F 13/53; G06F 3/04817; G06T 2207/30244; G06T 2219/2016
See application file for complete search history.

(56) References Cited

U.S. PATENT DOCUMENTS

| | | | |
|---|---|---|---|
| 2001/0049300 A1 | 12/2001 | Okamoto et al. | |
| 2004/0224761 A1 | 11/2004 | Nishimura | |
| 2005/0266921 A1 | 12/2005 | Hayashida et al. | |
| 2007/0191096 A1 | 8/2007 | Tanaka | |
| 2007/0202949 A1 | 8/2007 | Kawade et al. | |
| 2009/0160774 A1 | 6/2009 | Lee et al. | |
| 2009/0163274 A1 | 6/2009 | Kando | |
| 2009/0262112 A1 | 10/2009 | Yoshimura | |
| 2010/0009733 A1 | 1/2010 | Garvin et al. | |
| 2013/0165794 A1 | 6/2013 | Knoll et al. | |
| 2014/0171190 A1 | 6/2014 | Diard | |
| 2014/0243058 A1* | 8/2014 | Tsuchiya | A63F 13/426 |
| | | | 463/2 |
| 2018/0276874 A1 | 9/2018 | Myhill et al. | |
| 2021/0146248 A1* | 5/2021 | Chen | A63F 13/837 |

FOREIGN PATENT DOCUMENTS

| | | | |
|---|---|---|---|
| CN | 105641927 A | 6/2016 | |
| CN | 105988640 A | 10/2016 | |
| CN | 106155553 A | 11/2016 | |
| CN | 107029428 A | 8/2017 | |
| CN | 107050861 A | 8/2017 | |
| CN | 107213636 A | 9/2017 | |
| CN | 107519644 A | 12/2017 | |
| CN | 108415639 A | 8/2018 | |
| CN | 107029428 B | 6/2020 | |
| JP | 2001149643 A | 6/2001 | |
| JP | 2001321562 | 11/2001 | |

OTHER PUBLICATIONS

Chinese Office Action with concise English translation regarding 2018101369187 dated Dec. 1, 2020, 11 pages.
Second Chinese Office Action with concise English translation regarding 201810136918.7 dated May 24, 2021, 11 pages.
Japanese Office Action and Machine Translation regarding JP2020-564303 dated Jun. 5, 2001, 10 pages.
Chinese Office Action and concise English Translation regarding CN201810136918.7 dated Nov. 2, 2001, 10 pages.

\* cited by examiner

VIEWING ANGLE ADJUSTMENT METHOD AND DEVICE, ELECTRONIC DEVICE, AND COMPUTER-READABLE STORAGE MEDIUM

RELATED APPLICATION

This application is a continuation application of U.S. patent application Ser. No. 16/878,866, filed on May 20, 2020, granted as U.S. Pat. No. 11,977,713, which is incorporated herein by reference in its entirety. U.S. patent application Ser. No. 16/878,866, granted as U.S. Pat. No. 11,977,713, is a continuation application of PCT Patent Application No. PCT/CN2019/074131, filed on Jan. 31, 2019, which claims priority to Chinese Patent Application No. 201810136918.7, filed with the Chinese Patent Office on Feb. 9, 2018, both of which are incorporated herein by reference in their entireties.

FIELD OF THE TECHNOLOGY

The present disclosure relates to the field of computer technologies, and in particular, to a viewing angle adjustment method and device, an electronic device, and a computer-readable storage medium.

BACKGROUND OF THE DISCLOSURE

With the development of computer technologies and the diversity of terminal functions, more types of games can be played on a terminal. A shooting game like first-person shooting (FPS) or third-person shooting (TPS) is a type of popular game. In this type of game, an aiming point is usually displayed at a terminal screen center, and a user may adjust an area aimed at by the aiming point by adjusting a viewing angle of a virtual scenario.

Currently, in a viewing angle adjustment method, when a first virtual object is detected, a preset range around the first virtual object may be directly used as an adsorption area. Therefore, when a control operation of moving the aiming point to the first virtual object is detected after the aiming point is moved to the adsorption area, a rotation speed of a viewing angle corresponding to the control operation is accelerated, so that the aiming point can be moved on the body of the first virtual object quickly.

SUMMARY

Embodiments of the present disclosure provide a viewing angle adjustment method and device, an electronic device, and a computer-readable storage medium, which resolve a problem of high operation difficulty. The technical solutions are as follows:

The present disclosure describes various embodiment of a method for adjusting viewing angles. The method includes determining, by a device, an adsorption area of a first virtual object in a virtual scenario according to a distance between the first virtual object and a second virtual object, a size of the adsorption area being positively correlated with the distance between the first virtual object and a second virtual object. The device includes a memory storing instructions and a processor in communication with the memory. In response to an aiming point of the second virtual object being located in the adsorption area, the method includes obtaining, by the device, a target rotation speed of a viewing angle of the virtual scenario. The method also includes adjusting, by the device, the viewing angle of the virtual scenario according to the target rotation speed of the viewing angle.

The present disclosure describes various embodiment of a device for adjusting viewing angles. The device includes a memory storing instructions; and a processor in communication with the memory. When the processor executes the instructions, the processor is configured to cause the device to determine an adsorption area of a first virtual object in a virtual scenario according to a distance between the first virtual object and a second virtual object, a size of the adsorption area being positively correlated with the distance between the first virtual object and a second virtual object, in response to an aiming point of the second virtual object being located in the adsorption area, obtain a target rotation speed of a viewing angle of the virtual scenario, and adjust the viewing angle of the virtual scenario according to the target rotation speed of the viewing angle.

The present disclosure describes various embodiment of a non-transitory computer readable storage medium storing computer readable instructions. The computer readable instructions, when executed by a processor, are configured to cause the processor to perform determining an adsorption area of a first virtual object in a virtual scenario according to a distance between the first virtual object and a second virtual object, a size of the adsorption area being positively correlated with the distance between the first virtual object and a second virtual object; in response to an aiming point of the second virtual object being located in the adsorption area, obtaining a target rotation speed of a viewing angle of the virtual scenario; and adjusting the viewing angle of the virtual scenario according to the target rotation speed of the viewing angle.

In the present disclosure, the adsorption area of the first virtual object is determined based on the distance between the first virtual object and the second virtual object, and even if the distance is very large and a display size of the first virtual object is very small, the size of the adsorption area of the first virtual object may not be excessively small, so that a user may move the aiming point to the adsorption area of the first virtual object through a simple operation, so as to assist the user in rotating the viewing angle when the aiming point is located in the adsorption area, thereby reducing the operation difficulty of the user.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
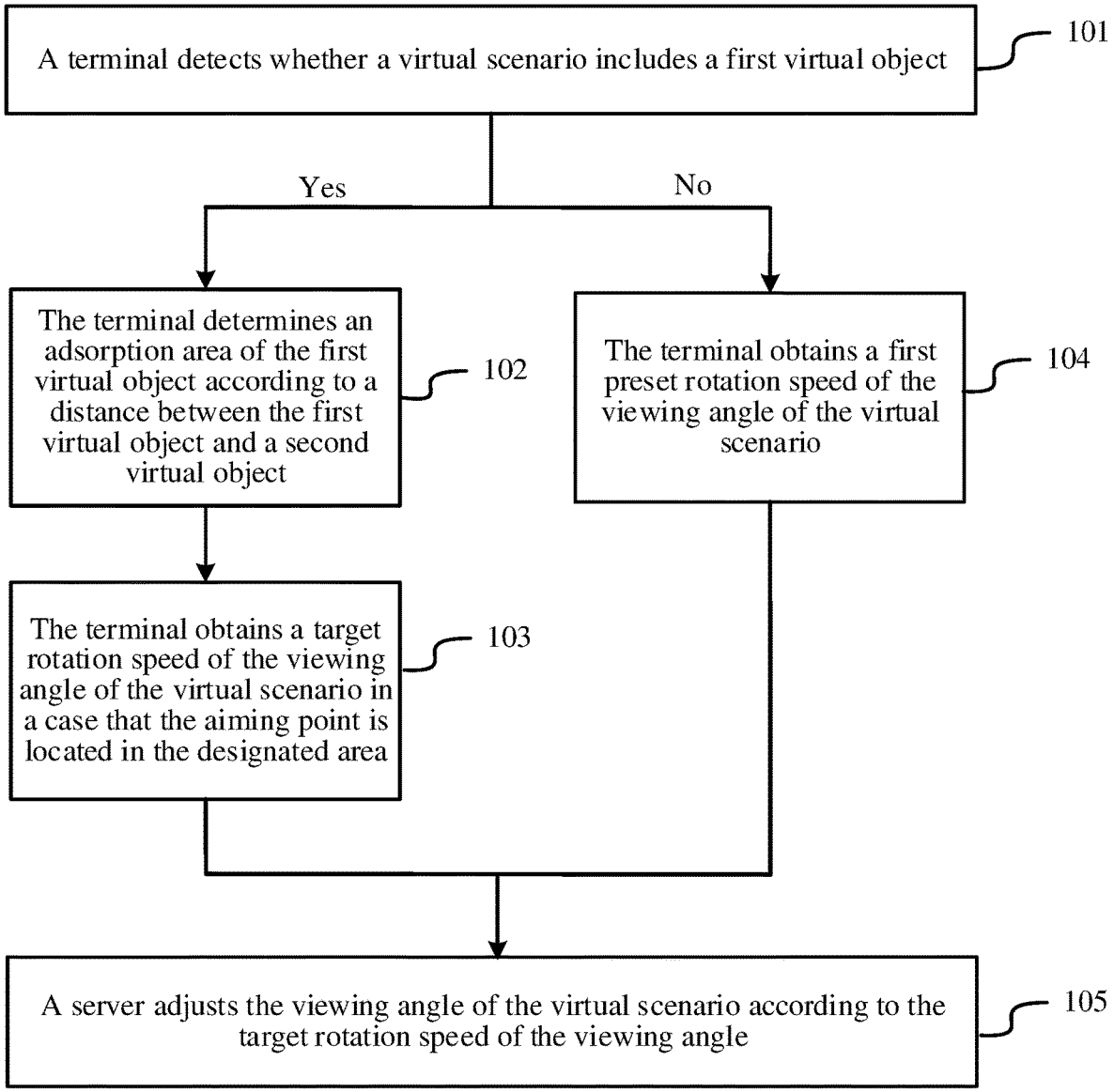
FIG. 1 is a flowchart of a viewing angle adjustment method according to an embodiment of the present disclosure.

The device and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the device and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Unless defined otherwise, all technical and scientific terms used herein have the same meaning as commonly understood by one of skill in the art to which the invention pertains. Although any methods and materials similar to or equivalent to those described herein may be used in the practice or testing of the present invention, the preferred methods and materials are described herein.

Embodiments of the present disclosure mainly relate to an electronic game scenario. In the electronic game scenario, a user may perform an operation on a terminal in advance, and a game configuration file of an electronic game may be downloaded after the terminal detects the operation of the user. The game configuration file may include an application, interface display data, virtual scenario data, or the like of the electronic game, so that the user may invoke the game configuration file when logging into the electronic game on the terminal, so as to render and display an electronic game interface. The user may perform a control operation on the terminal, and after detecting the control operation, the terminal may determine game data corresponding to the control operation and render and display the game data. The game data may include virtual scenario data, behavioral data of a virtual object in the virtual scenario, and the like.

The virtual scenario in the embodiments of the present disclosure may be used for simulating a virtual space, and the virtual space may be an open space. The virtual scenario may be used for simulating a three-dimensional virtual space, or may be used for simulating a two-dimensional virtual space, which is not limited in the embodiments of the present disclosure. The virtual scenario may be used for simulating an actual environment in reality. For example, the virtual scenario may include sky, land, ocean, and the like, and the land may include environmental factors like a desert and a city. The user may control a virtual object to move and perform various actions in the virtual scenario, the virtual object may be a virtual image representing the user in the virtual scenario, and the virtual image may be in any form, for example, a person or an animal, which is not limited in the embodiments of the present disclosure. Using a shooting game as an example, in the virtual scenario, the user may control the virtual object to fall freely, glide, or fall after a parachute is opened in the sky; or to run, jump, creep, bend forward in the land; or control the virtual object to swim, float, or dive in the ocean. Certainly, the user may further control the virtual object to ride in a vehicle to move in the virtual scenario. The foregoing scenarios are used as an example only herein, which is not specifically limited in the embodiments of the present disclosure. The user may further control the virtual object to fight with another virtual object with a weapon. The weapon may be a cold weapon, or may be a hot weapon, which is not specifically limited in the embodiments of the present disclosure. In the present disclosure, a virtual scenario may be a virtual view or a virtual scene.

Generally, a terminal screen displays a viewing angle image of a second virtual object, and the terminal screen may also display an aiming point of the second virtual object. The aiming point may be used for marking a target in the viewing angle image of the second virtual object, that is, the aiming point may be used as an attack impact point of the second virtual object, and a direction of the aiming point is used for indicating an attack direction of the second virtual object. Specifically, the aiming point may be displayed at a center position of the terminal screen. Certainly, the aiming point may also be displayed at other positions, which is not specifically limited in the embodiments of the present disclosure. The aiming point may have a plurality of display styles, and the aiming point may be displayed in a default display style of the system, or may be adjusted according to settings of the user. When seeing an aiming point displayed on the terminal, the user may determine whether the current aiming point aims at an area the user wants to aim at, and if not, the user may adjust the viewing angle of the virtual scenario through the control operation, so as to adjust the area aimed at by the aiming point. Certainly, the user usually wants to adjust the aiming point on the body of another virtual object in the virtual scenario quickly and accurately, so as to perform shooting, slapping, or boxing on the another virtual object.

In a possible implementation, the control operation may be a sliding operation. When detecting the sliding operation, the terminal may determine a rotation direction, a rotation angle, and a rotation speed of a viewing angle corresponding to the sliding operation based on a sliding direction, a sliding distance, and a sliding speed of the sliding operation. For example, the sliding direction of the sliding operation may correspond to the rotation direction of the viewing angle, and the sliding distance of the sliding operation and the rotation angle of the viewing angle may be positively correlated. Certainly, the sliding speed of the sliding operation and the rotation speed of the viewing angle may also be positively correlated.

In a possible implementation, the control operation may also be a pressing operation. Specifically, the terminal may be preset with a control area, and the user may perform the pressing operation in the control area. When detecting the pressing operation in the control area, the terminal may determine a rotation direction, a rotation speed, and a rotation angle of a viewing angle corresponding to the pressing operation based on a specific position of the pressing operation relative to the control area, and a pressing strength and a pressing time of the pressing operation. For example, a direction of the pressing operation relative to a center of the control area may correspond to the rotation direction of the viewing angle, the pressing strength of the pressing operation and the rotation speed of the viewing angle may be positively correlated, and the pressing time of the pressing operation and the rotation angle of the viewing angle may be positively correlated.

In another possible implementation, the control operation may further be a rotation operation on the terminal. When the rotation operation is detected, an angular velocity sensor (for example, a gyroscope) in the terminal may determine a rotation direction, a rotation angle, and a rotation speed of the viewing angle according to a rotation direction, a rotation angle, and a rotation speed of the rotation operation. For example, the rotation direction of the rotation operation may be the rotation direction of the viewing angle, the rotation angle of the rotation operation and the rotation angle of the viewing angle may be positively correlated, and the rotation speed of the rotation operation and the rotation speed of the viewing angle may be positively correlated. In a possible implementation, the control operation may further be a push-button operation or a toggle operation on a real joystick device, which is not specifically limited in the embodiments of the present disclosure.

Certainly, when the user controls the virtual object, different control effects may be further implemented through a combination of the foregoing control operations. For example, the control operation performed on the viewing angle by the user is the sliding operation, and during the sliding operation, the terminal detects a pressing strength of the operation in the sliding operation process, so as to determine whether to shoot based on whether the pressing strength is greater than a preset pressing strength. The foregoing is merely an exemplary description, and how to combine the foregoing control operations and which control effects may be implemented are not specifically limited in the embodiments of the present disclosure.

In the embodiments of the present disclosure, taking a terminal of a user as an example, the another virtual object may be referred to as a first virtual object, and the virtual object controlled by the terminal of the user is referred to as a second virtual object. In the terminal of the user, the virtual scenario may be displayed at any viewing angle, and the displayed virtual scenario may include the first virtual object located at the display area.

In a possible implementation, the terminal may provide two display manners for the second virtual object controlled by the terminal of the user. A first display manner is a first-person viewing angle or a first-person perspective. In the first display manner, the virtual scenario displayed by the terminal of the user may only include a hand or an arm of the second virtual object, or a weapon held in a hand of the second virtual object. The first display manner is used for simulating a scenario of observing the virtual scenario through the viewing angle of the second virtual object. In the display manner of the first-person viewing angle or the first-person perspective, a camera may be usually located at an eye of the virtual object, or may be located at an area near an eye of the virtual object, for example, a head or a chest of the virtual object. A second display manner is a third-person viewing angle or a third-person perspective. In the second display manner, the virtual scenario displayed by the terminal of the user may further include the second virtual object, and a direction of the third-person viewing angle or the third-person perspective is consistent with that of the first-person viewing angle or the first-person perspective, except that the second virtual object is displayed in the virtual scenario, so that the user may see an action and a surrounding environment of the second virtual object controlled by the user in the virtual scenario. The third-person viewing angle or the third-person perspective is used for simulating a scenario of observing the virtual scenario at a position around the virtual object. In the display manner of the third-person viewing angle or the third-person perspective, the camera may usually be located behind the virtual object. The display manners adopted by the terminal of the user are not specifically limited in the embodiments of the present disclosure.

In the viewing angle adjustment method provided in the embodiments of the present disclosure, after the user adjusts the viewing angle of the virtual scenario to change the position of the aiming point, an aiming assistant service may be provided when the user wants to perform aimed shooting on the first virtual object, thereby reducing the operation difficulty for the user to aim shooting on the first virtual object. The following describes one embodiment of the viewing angle adjustment method and how to provide the aiming assistant service for the aimed shooting of the user in the procedure in detail, as shown in FIG. 1.

FIG. 1 is a flowchart of a viewing angle adjustment method according to an embodiment of the present disclosure. The viewing angle adjustment method is applied to an electronic device. The following uses an example in which the electronic device is a terminal for description. Referring to FIG. 1, the viewing angle adjustment method includes the following steps:

101. A terminal detects whether a virtual scenario includes a first virtual object, and if yes, performs step 102; if no, performs step 104.

When a person in a real scenario is aiming, a direction of the person's line of sight is usually an aiming direction. During adjustment of the aiming direction, a body orientation is usually adjusted to change the aiming direction, that is, the person is usually facing the aiming direction. Correspondingly, a direction of the viewing angle of the virtual scenario in the shooting game is usually a direction of a line of sight and a body orientation of the virtual object controlled by the terminal. Therefore, the user may adjust the position of the aiming point by adjusting the viewing angle of the virtual scenario through the control operation, so as to adjust an area aimed at by the aiming point. The control operation may be any one or a combination of the sliding operation, the pressing operation, the rotation operation, the push-button operation, or the toggle operation, which is not limited in the embodiments of the present disclosure.

Step 101 may be triggered when the terminal detects the control operation of the user, or may be performed by the terminal regularly, and an execution cycle thereof may be preset by a person skilled in the art, or may be adjusted according to actual requirements of the user. The following uses an example in which step 101 is triggered when the terminal detects the control operation for description. When detecting the control operation, the terminal may first detect whether there is a person in the virtual scenario, so as to preliminarily determine whether an aiming assistant service needs to be provided. Specifically, the terminal may detect whether the virtual scenario includes a first virtual object, and when the virtual scenario includes the first virtual object, the control operation performed by the user may be to perform the aimed shooting on the first virtual object, and the terminal may further determine whether a position of the current aiming point meets the condition for providing the aiming assistant service. When it is determined that the position of the aiming point meets the condition for providing the aiming assistant service, the aiming assistant service may be provided for a viewing angle adjustment procedure of a virtual scenario corresponding to the control operation of the user. For the specific procedure, reference may be made to step 102, step 103, and step 105. When the virtual scenario does not include the first virtual object, the user has no object to perform the aimed shooting, that is, the control operation performed by the user is not to perform the aimed shooting on the first virtual object, but only to adjust the viewing angle, so that the terminal may perform step 104 and step 105, and directly adjust the viewing angle based on the control operation.

Step 102. The terminal determines an adsorption area of the first virtual object according to a distance between the first virtual object and a second virtual object in a case that the virtual scenario includes the first virtual object.

When the virtual scenario includes the first virtual object, the terminal may provide the user with the aiming assistant service when the aiming point is relatively close to the first virtual object. Therefore, the terminal may determine an adsorption area of the first virtual object. The adsorption area refers to a position of an aiming point at which the terminal may provide an aiming assistant service when aiming at the first virtual object. That is, when the aiming point is located in the adsorption area, the aiming point may be regarded to be relatively close to the first virtual object, and the terminal may provide the aiming assistant service, so as to reduce the operation difficulty of the user. However, when the aiming point is relatively far from the first virtual object, the terminal may not provide the aiming assistant service. The user needs to perform a control operation to move the aiming point to the adsorption area, and the terminal may assist the user, so as to ensure equity and fairness of the electronic game sports while providing convenience for the aimed shooting of the user and reducing the operation difficulty.

When determining the adsorption area of the first virtual object, the terminal needs to consider the distance between the first virtual object and the second virtual object. The distance and a size of the adsorption area are positively correlated, that is, a larger distance indicates a larger size of the adsorption area, and a smaller distance indicates a smaller size of the adsorption area. In this way, when the distance between the first virtual object and the second virtual object is large, the display size of the first virtual object is small, and the display size of the adsorption area of the first virtual object may not be excessively small, so that the user may adjust the viewing angle through the control operation easily, so as to move the position of the aiming point to the adsorption area of the first virtual object, thereby playing an assisting role of assisting shooting.

Specifically, the specific procedure of step 102 may include the following two situations:

A first situation: The terminal may determine the size of the adsorption area of the first virtual object to be zero in a case that the distance is less than a first preset distance or the distance is greater than a second preset distance.

In the first situation, the first preset distance may be a relatively small distance, and the second preset distance may be a relatively large distance. The first preset distance and the second preset distance may be set by a person skilled in the art according to self experience, and may be adjusted according to a test result, which are not specifically limited in the embodiments of the present disclosure.

When the distance is less than the first preset distance, it indicates that the first virtual object is very close to the second virtual object, the display size of the first virtual object has been relatively large, and the aiming point has been relatively close to the first virtual object, or the aiming point has been on the body of the first virtual object, so that the user can perform the aimed shooting on the first virtual object easily. To ensure the equity and fairness of the electronic game sports, the terminal may not provide the aiming assistant service in this situation, and the size of the adsorption area of the first virtual object is determined to be zero. When the distance is larger than the second preset distance, it indicates that the first virtual object is very far from the second virtual object, and the displayed size of the first virtual object is relatively small, it is even possible to display a point or almost nothing in the virtual scenario, and the user may not see the first virtual object through the terminal, and may not aim at the first virtual object as a result. To ensure the equity of the electronic game sports, the terminal may not provide help for the user to find the first virtual object, therefore, the terminal may not provide the assisting aiming service in this situation, and the size of the adsorption area of the first virtual object is determined to be zero.

A second situation: The terminal may determine an area in a preset range around the first virtual object to be the adsorption area of the first virtual object in a case that the distance between the first virtual object and the second virtual object is greater than or equal to the first preset distance and less than or equal to the second preset distance, a size of the preset range and the distance being positively correlated.

Figure 2:
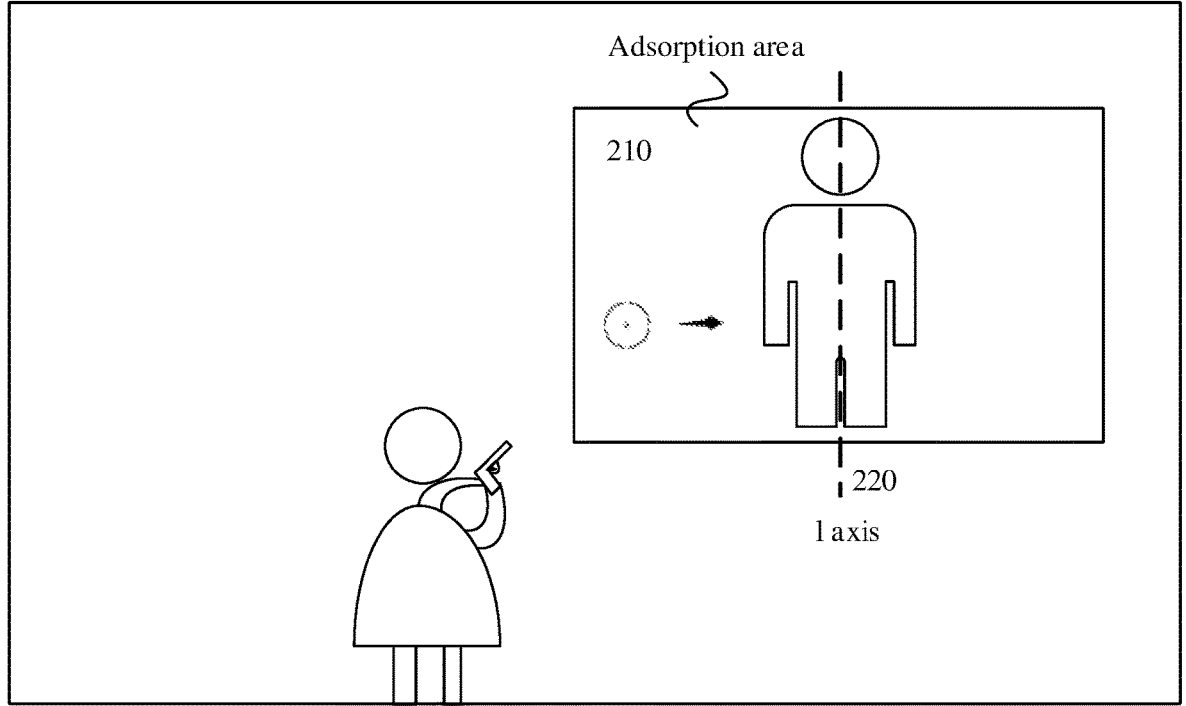
FIG. 2 is a schematic diagram of an adsorption area of a first virtual object according to an embodiment of the present disclosure.

In the second situation, the distance of the first virtual object is between the first preset distance and the second preset distance. It indicates that the user may see the first virtual object, and the display size of the first virtual object may not be excessively large. The terminal may determine an area around the first virtual object as the adsorption area, so as to provide the aiming assistant service when the aiming point is located around the first virtual object. The following provides an example for the adsorption area of the first virtual object by using FIG. 2 as an example. As shown in FIG. 2, an adsorption area 210 may be an area shown in FIG. 2. If a center axis of the first virtual object is an l axis 220, a center axis of the area is also the l axis 220. FIG. 2 is an exemplary description, and in a possible implementation, a shape of the adsorption area may be a cylinder, or may be a cube, a cuboid, or the like. The shape of the adsorption area of the first virtual object is not specifically limited in the embodiments of the present disclosure.

In a possible implementation, a height of the adsorption area and a height of the first virtual object may be positively correlated. A larger height of the first virtual object indicates a larger height of the adsorption area, and a smaller height of the first virtual object indicates a smaller height of the adsorption area. Specifically, a product of the height of the first virtual object multiplied by a specified factor may be used as the height of the adsorption area. The specified factor may be pre-defined by a game provider, or may be configured by a user. Certainly, the height of the adsorption area may also be a sum value of the height of the first virtual object and a specified height-value. The specified height-value may be pre-defined by a game provider, or may be configured by a user. There are various manners of determining the height of the adsorption area, and any specific manner is not specifically limited in the embodiments of the present disclosure.

Step 103. The terminal obtains a target rotation speed of the viewing angle of the virtual scenario in a case that the aiming point is located in the adsorption area.

After determining the adsorption area of the first virtual object, the terminal may determine whether the aiming point is located in the adsorption area, to determine whether to provide the aiming assistant service.

Currently, a viewing angle that can be seen by the user through the terminal is the viewing angle of the second virtual object, and a direction indicated by an aiming point indicated by a terminal screen center is an aiming direction of the current viewing angle, that is, an aiming line. When determining whether the aiming point is located in the adsorption area, the terminal may first determine a position of the aiming point in the virtual scenario. Specifically, the terminal may use a point closest to the first virtual object on a line at which the current aiming point is located as the aiming point, and an intersection of a horizontal plane of the aiming point and the center axis of the first virtual object may be used as a target point. A directed line segment of the aiming point to the target point may be a shortest path for moving the aiming point on the body of the first virtual object. Certainly, in a possible implementation, an aiming point similar to the aiming point and a shortest path may be obtained through simple calculation, so as to reduce the amount of calculation. There are various manners for position determining procedures of the aiming point, and any specific manner is not specifically limited in the embodiments of the present disclosure.

After determining the position of the aiming point, the terminal may determine whether the aiming point is located in the adsorption area. If the aiming point is located in the adsorption area, the terminal may provide the aiming assistant service, that is, the target rotation speed of the viewing angle of the virtual scenario obtained by the terminal is different from that when the aiming assistant service is not provided. When the aiming point is not located in the adsorption area, the terminal may not provide the aiming assistant service. Therefore, the terminal may directly obtain a first preset rotation speed as the target rotation speed of the viewing angle. The first preset rotation speed refers to a normal rotation speed of the viewing angle during an operation of the user when the terminal does not provide the aiming assistant service.

Figure 3:
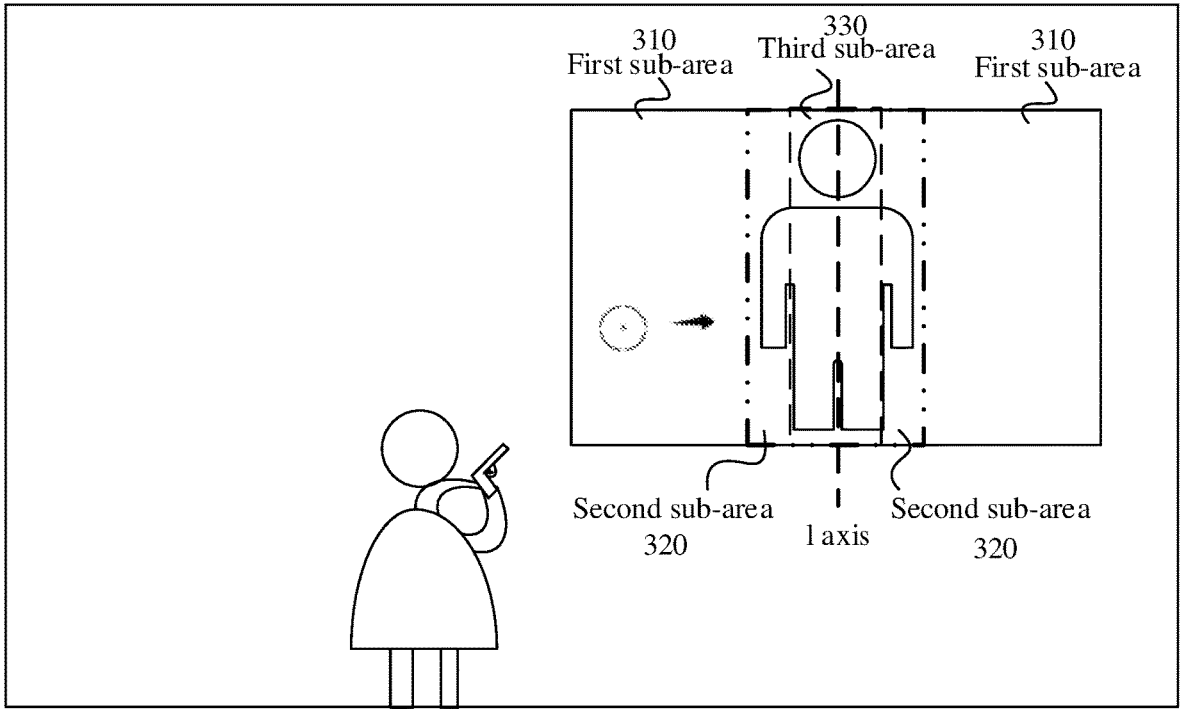
FIG. 3 is a schematic diagram of an adsorption area of a first virtual object according to an embodiment of the present disclosure.

However, in a case that the aiming point is located in the adsorption areas, when the aiming point is located in different sub-areas of the adsorption area, the target rotation speeds of the viewing angle obtained by the terminal may also be different. In the embodiments of the present disclosure, the adsorption area may be an area covering the entire body of the first virtual object. Using an example in which the adsorption area includes a first sub-area, a second sub-area, and a third sub-area for description, the first sub-area surrounds outside the second sub-area, and the second sub-area surrounds outside the third sub-area. FIG. 3 is a schematic diagram of an adsorption area of a first virtual object according to an embodiment of the present disclosure. The adsorption area of the first virtual object may be divided into the first sub-area 310, the second sub-area 320, and the third sub-area 330 according to their distance from a center of the first virtual object. A shape of the adsorption area and a sub-area division are not specifically limited in the embodiments of the present disclosure. The following may describe the target rotation speeds of the viewing angles of different virtual scenarios obtained by the terminal when the aiming point is located at the three sub-areas of the adsorption area respectively.

A first situation: The terminal obtains a second preset rotation speed as the target rotation speed of the viewing angle of the virtual scenario in a case that the aiming point is located in the first sub-area of the adsorption area, the second preset rotation speed being greater than a first preset rotation speed.

In the first situation, the aiming point is located in the first sub-area of the adsorption area, that is, the aiming point is located around the first virtual object, but still has a certain distance from the first virtual object, so that when obtaining a target rotation speed of the viewing angle, the terminal may obtain a rotation speed greater than the first preset rotation speed as the target rotation speed of the viewing angle. In this way, the rotation speed of the viewing angle is faster, so that the aiming point can move faster to the first virtual object, so as to assist the user in aiming fast, thereby reducing the operation difficulty of the user. The second preset rotation speed may be preset by a person skilled in the art, or may be determined by the terminal according to the first preset rotation speed. Correspondingly, the terminal may obtain a preset second preset rotation speed as the target rotation speed, or obtain a second preset rotation speed greater than the first preset rotation speed through calculation based on the first preset rotation speed. A specific value and a determining procedure of the second preset rotation speed are not specifically limited in the embodiments of the present disclosure.

A second situation: The terminal obtains a third preset rotation speed as the target rotation speed of the viewing angle of the virtual scenario in a case that the aiming point is located in the second sub-area of the adsorption area, the third preset rotation speed being less than the first preset rotation speed.

In the second situation, when the aiming point is located in the second sub-area of the adsorption area, it indicates that the aiming point is located around the first virtual object and is very close to the first virtual object. To prevent the user from adjusting the viewing angle through the control operation, causing the aiming point to move quickly, move beyond the area at which the first virtual object is located, or even move out of the second sub-area, the terminal may obtain a rotation speed less than the first preset rotation speed as the target rotation speed of the viewing angle. In this way, the rotation speed of the viewing angle slows down, and even if the user performs a touch control operation greatly, the viewing angle may not rotate much, so that the aiming point cannot be easily away from the first virtual object quickly, thereby assisting the aiming.

Correspondingly, based on the change of the rotation speed of the viewing angle, the user may adjust the area aimed at by the aiming point more precisely, that is, the user may adjust the viewing angle tinily by adjusting the control operation greatly, so as to adjust the aiming point tinily, for example, to adjust the body part of the aimed first virtual object tinily.

In a possible implementation, the third preset rotation speed may be preset by a person skilled in the art, or may be determined by the terminal according to the first preset rotation speed. Correspondingly, the terminal may obtain a preset third preset rotation speed as the target rotation speed, or obtain a third preset rotation speed less than the first preset rotation speed through calculation based on the first preset rotation speed. A specific value of the third preset rotation speed is not specifically limited in the embodiments of the present disclosure.

A third situation: The terminal obtains a fourth preset rotation speed as the target rotation speed of the viewing angle of the virtual scenario in a case that the aiming point is located in the third sub-area of the adsorption area, the fourth preset rotation speed being less than the first preset rotation speed.

In the third situation, when the aiming point is located in the third sub-area of the adsorption area, it indicates that the aiming point has been located on the body of the virtual object, or may be located at a position very close to the virtual object. In this situation, the terminal does not need to accelerate the target rotation speed of the viewing angle corresponding to the control operation of the user, but to consider that the aiming point may be quickly moved to a position very far from the first virtual object if the rotation speed is excessively fast, so that the terminal may obtain a rotation speed less than the first preset rotation speed as the target rotation speed of the viewing angle. In this way, the user may rotate the viewing angle tinily by performing the control operation greatly, so as to move the aiming point tinily, and to adjust the area aimed at by the aiming point more precisely. The fourth preset rotation speed may be less than the third preset rotation speed. Certainly, the fourth preset rotation speed may also be equal to or greater than the third preset rotation speed. A magnitude relationship between the fourth preset rotation speed and the third preset rotation speed is not specifically limited in the embodiments of the present disclosure. The fourth preset rotation speed may be preset by a person skilled in the art, or may be determined by the terminal according to the first preset rotation speed. Correspondingly, the terminal may obtain a preset fourth preset rotation speed as the target rotation speed, or obtain a fourth preset rotation speed less than the first preset rotation speed or the third preset rotation speed through calculation based on the first preset rotation speed or the third preset rotation speed. A specific value of the fourth preset rotation speed is not specifically limited in the embodiments of the present disclosure.

The foregoing three situations are different situations that the terminal obtains the target rotation speed of the viewing angle when the aiming point is located in the adsorption area. In a possible implementation, the terminal may rotate the viewing angle at different speeds according to different movement directions of the aiming point. For example, when the movement direction of the aiming point is toward the first virtual object, a rotation speed greater than the first preset rotation speed may be obtained; and when the movement direction of the aiming point is away from the first virtual object, the first preset rotation speed or a fifth preset rotation speed that is less than the first preset rotation speed may be obtained.

Step 104. The terminal obtains the first preset rotation speed of the viewing angle of the virtual scenario in a case that the virtual scenario does not include the first virtual object. In one implementation, the terminal may use the first preset rotation speed of the viewing angle as the target rotation speed of the viewing angle.

When in the virtual scenario does not include the first virtual object, the user has no target to aim at, so that the terminal does not need to provide the aiming assistant service. Therefore, the terminal may obtain a default rotation speed of the viewing angle of the system, that is, the normal rotation speed (the first preset rotation speed) of the viewing angle when the user performs the control operation.

Step 105. A server adjusts the viewing angle of the virtual scenario according to the target rotation speed of the viewing angle. Under various situations, the target rotation speed of the viewing angle may be one of following rotation speeds, including but not limited to, a first preset rotation speed of the viewing angle, a second preset rotation speed of the viewing angle, a third preset rotation speed of the viewing angle, a fourth preset rotation speed of the viewing angle, or a fifth preset rotation speed of the viewing angle.

A specific procedure that the terminal adjusts the viewing angle of the virtual scenario includes: calculating, by the terminal, a movement distance of the aiming point at a preset time interval according to the target rotation speed of the viewing angle; calculating, by the terminal, a rotation angle of the viewing angle of the virtual scenario at the preset time interval based on the movement distance and the distance between the first virtual object and the second virtual object; and adjusting, by the terminal, the viewing angle of the virtual scenario every the preset time interval to rotate by the rotation angle. The preset time interval refers to a time interval between adjacent frames, and the preset time interval may be preset by a person skilled in the art, or may be set and adjusted by the user according to the running situation of the device.

Step 101 to step 105 are a dynamic viewing angle adjustment procedure, and the terminal may perform step 101 to step 104 at each frame. After obtaining the target rotation speed of the viewing angle through calculation at each frame, the terminal may calculate a movement distance of the aiming point and a rotation angle of the viewing angle from this frame to a next frame time based on the target rotation speed of the viewing angle, so as to obtain a viewing angle direction and an aiming point position of the next frame time to be rendered and displayed at the next frame. Then the terminal repeats the foregoing detection, obtaining, and adjustment procedures at the next frame.

In a possible implementation, for the first situation and the second situation in step 103, the procedure that the terminal performs the adjustment according to the obtained target rotation speed of the viewing angle may further include: obtaining, by the terminal, a horizontal rotation speed and a vertical rotation speed of the viewing angle by decomposing the target rotation speed of the viewing angle according to a horizontal direction and a vertical direction; and adjusting, by the terminal, the viewing angle of the virtual scenario according to the horizontal rotation speed only. In this implementation, the terminal may ignore the vertical rotation speed, that is, in the viewing angle adjustment procedure, the height of the aiming point remains unchanged, and the control operation performed by the user is only to move the aiming point to the first virtual object horizontally, thereby assisting the user in aiming quickly.

The following provides an example for the specific procedure of the viewing angle adjustment method: The user operates on the terminal, the virtual scenario displayed by the terminal includes a first virtual object, and the current aiming point is very far from the first virtual object. The user performs the control operation, and the terminal obtains the first preset rotation speed as the target rotation speed of the viewing angle, so as to adjust the viewing angle to move the aiming point to the first virtual object. When the aiming point is slightly closer to the first virtual object, the terminal obtains the second preset rotation speed as the target rotation speed of the viewing angle, so that the rotation speed of the viewing angle becomes faster. The user still performs the control operation, and the terminal obtains the third preset rotation speed as the target rotation speed of the viewing angle when the aiming point is very close to the first virtual object, so that a movement speed of the viewing angle becomes slower, and the user may have a viscous feeling during an viewing angle adjustment operation. When the aiming point has been located in a trunk area of the first virtual object, the user continues to perform the control operation, the terminal obtains the fourth preset rotation speed, and the rotation speed of the viewing angle becomes much slower when the viewing angle is controlled to rotate, so that the user may perform the control operation greatly, the terminal may control the viewing angle adjustment, and the aiming point can be aimed at each part of the first virtual object precisely.

The present disclosure may provide another embodiment, in which there may be another possible scenario in step 103. When the aiming point is located in the adsorption area and the first virtual object is moving or has moved, the aiming point may be controlled to move with the first virtual object. In the scenario, step 105 may include: displaying, by the terminal based on the target rotation speed of the viewing angle and the movement speed of the first virtual object, that the aiming point moves with the first virtual object in the virtual scenario. Specifically, the terminal may obtain the movement speed of the viewing angle by using the obtaining manner of the movement speed of the viewing angle in step 103, and stack a speed used for following the first virtual object based on the target rotation speed of the viewing angle. In this way, the user may enable the aiming point to follow the first virtual object through a simple operation without losing the aimed target, thereby reducing the operation difficulty of the user. During the viewing angle adjustment procedure, the adjustment procedure of the viewing angle includes not only performing adjustment according to the obtained movement speed of the viewing angle, but also performing corresponding adjustment according to the movement speed of the first virtual object.

Figure 4:
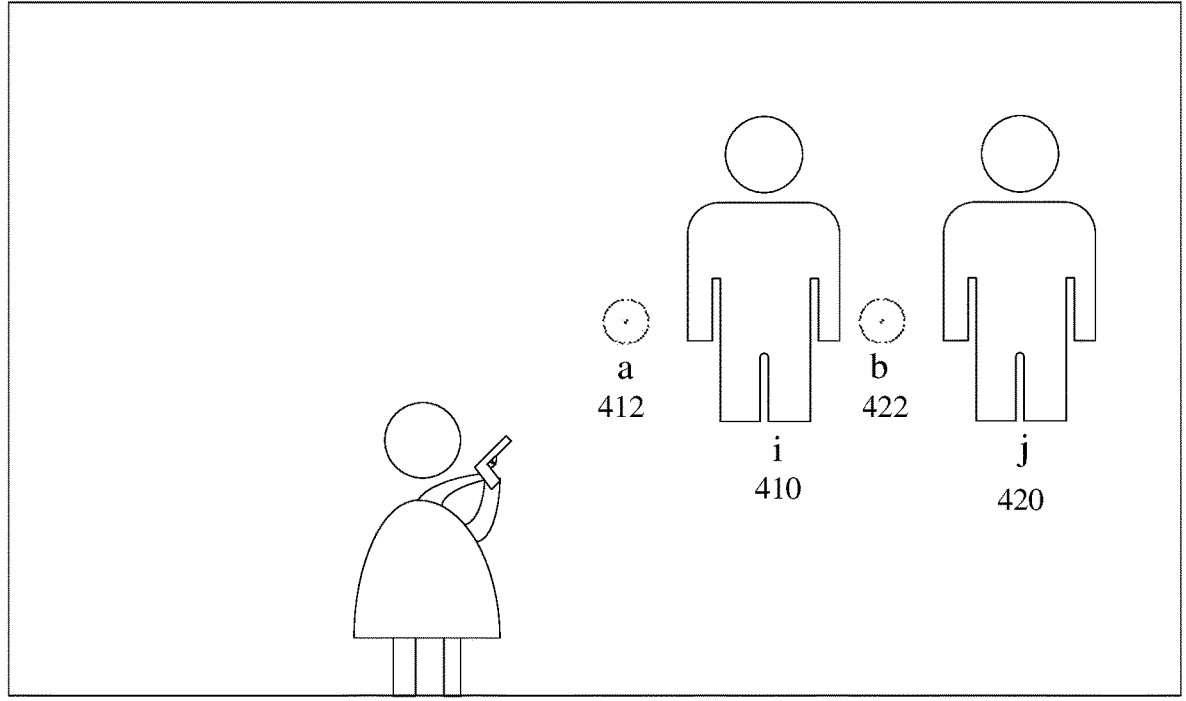
FIG. 4 is a schematic diagram of a viewing angle adjustment method according to an embodiment of the present disclosure.

When a displayed aiming point moves with the first virtual object in the virtual scenario, a magnitude of a follow-up speed of the aiming point and a magnitude of the movement speed of the first virtual object may be positively correlated, or the follow-up speed may be a speed with a fixed magnitude. When the magnitude of the follow-up speed of the aiming point and the magnitude of the movement speed of the first virtual object are positively correlated, a proportion between the magnitude of the follow-up speed and the magnitude of the movement speed of the first virtual object may be preset by a person skilled in the art. The proportion is less than or equal to 1. Generally, to ensure the equity and fairness of the electronic game sports, the proportion is usually set to be less than 1. For example, as shown in FIG. 4, if the movement speed of the first virtual object is considered only, and the proportion is 1, when the first virtual object moves from a position i 410 to a position j 420, and the terminal performs the viewing angle adjustment, the displayed aiming point may move from a position a 412 to a position b 422, and a relative position between the aiming point and the first virtual object remains unchanged. FIG. 4 is only used for describing the relative position between the aiming point and the first virtual object. Generally, a display position of the aiming point may be a center of the screen, and in the adjustment procedure, the viewing angle of the virtual scenario may also change, which is not shown in FIG. 4.

In the viewing angle adjustment procedure, if the control operation of the user is ended, but the aiming point is located in the third sub-area of the adsorption area and the first virtual object has moved, the terminal may further controls the aiming point to move with the first virtual object in a first preset time duration after the control operation is ended. That is, the terminal displays, based on the target rotation speed of the viewing angle and the movement speed of the first virtual object, that the aiming point moves with the first virtual object in the virtual scenario. The first preset time duration may be set by a person skilled in the art based on operation habits of general users. For example, the first preset time duration may be 0.5 second. A value of the first preset time duration is not specifically limited in the embodiments of the present disclosure. In this situation, the control operation of the user is ended, but the viewing angle may still move with the first virtual object for a certain time duration, so that the viewing angle adjustment procedure of the virtual scenario is continuous when the user performs a switch operation, thereby enabling the operation of the user to be more coherent, and providing better user experience. For example, in the viewing angle adjustment procedure, the user ends the current control operation, and clicks a shooting button to continue to perform the control operation. In this way, the aiming point may move with the first virtual object continuously.

The present disclosure describes another implementation of providing a delay mechanism. In the viewing angle adjustment procedure, when the control operation is ended, the terminal may adjust the viewing angle of the virtual scenario according to a target rotation speed of a viewing angle at a moment before the control operation is ended within a second preset time duration; and the terminal may stop adjusting the viewing angle of the virtual scenario when a control operation is not detected within a second preset time duration. In another implementation, the terminal may continue adjusting the viewing angle of the virtual scenario after a control operation is stopped, and when a new control operation is not detected within the second preset time duration since the control operation is stopped, stop adjusting the viewing angle of the virtual scenario. The second preset time duration may be set by a person skilled in the art based on operation habits of general users. The second preset time duration and first preset time duration may have a same value or may have different values. For example, the second preset time duration may also be 0.5 s. A value of the second preset time duration is not specifically limited in the embodiments of the present disclosure. In this way, the viewing angle adjustment procedure of the virtual scenario is continuous when the user performs a switch operation, thereby enabling the operation of the user to be more coherent, and providing better user experience.

In the embodiments of the present disclosure, the adsorption area of the first virtual object is determined based on the distance between the first virtual object and the second virtual object, and even if the distance is very large and a display size of the first virtual object is very small, the size of the adsorption area of the first virtual object may not be excessively small, so that a user may move the aiming point to the adsorption area of the first virtual object through a simple operation, so as to assist the user in rotating the viewing angle when the aiming point is located in the adsorption area, thereby reducing the operation difficulty of the user. Further, the distance is limited in the embodiments of the present disclosure, and the aiming assistant service is only provided when the distance meets the requirements, thereby ensuring the equity and fairness of the electronic game sports while reducing the operation difficulty. Further, in the embodiments of the present disclosure, the aiming point can move faster to the first virtual object by accelerating the rotation speed of the viewing angle when the aiming point is located around the first virtual object, so as to assist the user in aiming quickly, thereby reducing the operation difficulty of the user. Further, in the embodiments of the present disclosure, a situation that the user moves the aiming point out of the adsorption area through the control operation is avoided by reducing the rotation speed of the viewing angle when the aiming point is located in the second sub-area or the third sub-area of the adsorption area, thereby reducing the operation difficulty of the user. At the same time, the user may adjust the viewing angle tinily by performing the control operation greatly, thereby adjusting the aiming point tinily, and adjusting the area aimed at by the aiming point more precisely. Further, in the embodiments of the present disclosure, a speed following the first virtual object is provided in the viewing angle adjustment procedure when the aiming point is located in the adsorption area. In this way, the user may enable the aiming point to follow the first virtual object through a simple operation without losing the aimed target, thereby reducing the operation difficulty of the user. Further, in the embodiments of the present disclosure, when the control operation of the user is ended, the viewing angle continues to be adjusted by setting one or more preset time durations, so that the aiming point is enabled to continuously move to the first virtual object when the user performs a switch operation, and the operation of the user may be more coherent and convenient.

An optional embodiment of the present disclosure may be formed by using any combination of all the foregoing optional technical solutions, and details are not described herein.

Figure 5:
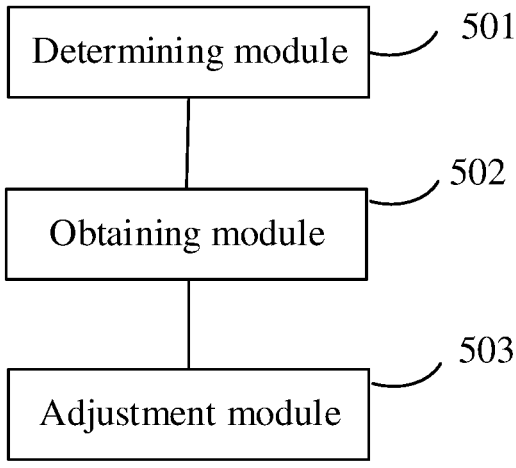
FIG. 5 is a schematic structural diagram of a viewing angle adjustment device according to an embodiment of the present disclosure.

FIG. 5 is a schematic structural diagram of a viewing angle adjustment device according to an embodiment of the present disclosure. The device includes:

a determining module 501, configured to determine an adsorption area of a first virtual object according to a distance between the first virtual object and a second virtual object, the distance and a size of the adsorption area being positively correlated;

an obtaining module 502, configured to obtain a target rotation speed of a viewing angle of a virtual scenario in a case that an aiming point of the second virtual object is located in the adsorption area; and an adjustment module 503, configured to adjust the viewing angle of the virtual scenario according to the target rotation speed of the viewing angle.

In an embodiment, the device further includes:

a detection module, configured to detect whether the virtual scenario includes the first virtual object.

The determining module 501 is configured to perform the step of determining an adsorption area of a first virtual object according to a distance between the first virtual object and a second virtual object in a case that the virtual scenario includes the first virtual object.

The obtaining module 502 is configured to obtain a first preset rotation speed of the viewing angle of the virtual scenario in a case that the virtual scenario does not include the first virtual object.

In an embodiment, the determining module 501 is configured to:

determine the size of the adsorption area of the first virtual object to be zero in a case that the distance is less than a first preset distance or the distance is greater than a second preset distance; and determine an area in a preset range around the first virtual object to be the adsorption area of the first virtual object in a case that the distance between the first virtual object and the second virtual object is greater than or equal to the first preset distance and less than or equal to the second preset distance, a size of the preset range and the distance being positively correlated.

In an embodiment, the obtaining module 502 is configured to:

obtain a second preset rotation speed as the target rotation speed of the viewing angle of the virtual scenario in a case that the aiming point is located in the first sub-area of the adsorption area, the second preset rotation speed being greater than the first preset rotation speed; and obtain a third preset rotation speed as the target rotation speed of the viewing angle of the virtual scenario in a case that the aiming point is located in the second sub-area of the adsorption area, the third preset rotation speed being less than the first preset rotation speed, where the first sub-area surrounds outside the second sub-area.

In an embodiment, the obtaining module 502 is configured to:

obtain a horizontal rotation speed and a vertical rotation speed of the viewing angle by decomposing the target rotation speed of the viewing angle according to a horizontal direction and a vertical direction; and adjust the viewing angle of the virtual scenario according to the horizontal rotation speed only.

In an embodiment, the obtaining module 502 is configured to:

obtain a fourth preset rotation speed as the target rotation speed of the viewing angle of the virtual scenario in a case that the aiming point is located in the third sub-area of the adsorption area, the fourth preset rotation speed being less than the first preset rotation speed, where the second sub-area surrounds outside the third sub-area.

In an embodiment, the device further includes:

a display module, configured to control the aiming point to move with the first virtual object in a case that the aiming point is located in the adsorption area and the first virtual object has moved.

In an embodiment, the adjustment module 503 is configured to:

calculate a movement distance of the aiming point at a preset time interval according to the target rotation speed of the viewing angle;

calculate a rotation angle of the viewing angle of the virtual scenario at the preset time interval based on the movement distance and the distance between the first virtual object and the second virtual object; and adjust the viewing angle of the virtual scenario every the preset time interval to rotate by the rotation angle.

In an embodiment, the adjustment module 503 is further configured to:

adjust, after a control operation in a viewing angle adjustment procedure is ended, the viewing angle of the virtual scenario according to a target rotation speed of a viewing angle at a moment before the control operation is ended within a preset time duration; and stop adjusting the viewing angle of the virtual scenario in a case that the control operation is not detected within the preset time duration.

The device provided in the embodiments of the present disclosure determines the adsorption area of the first virtual object based on the distance between the first virtual object and the second virtual object, and even if the distance is very large and a display size of the first virtual object is very small, the size of the adsorption area of the first virtual object may not be excessively small, so that a user may move the aiming point to the adsorption area of the first virtual object through a simple operation, so as to assist the user in rotating the viewing angle when the aiming point is located in the adsorption area, thereby reducing the operation difficulty of the user.

When the viewing angle adjustment device provided in the foregoing embodiment adjusts the viewing angle, only an example of division of the foregoing functional modules is described, and in actual application, the foregoing functions may be implemented by different functional modules as required, that is, the internal structure of the device is divided into different functional modules, to implement all or some of the functions described above. In addition, the viewing angle adjustment device provided in the foregoing embodiment and the viewing angle adjustment method embodiments belong to one conception. For the specific implementation process, refer to the method embodiments, and details are not described herein again.

Figure 6:
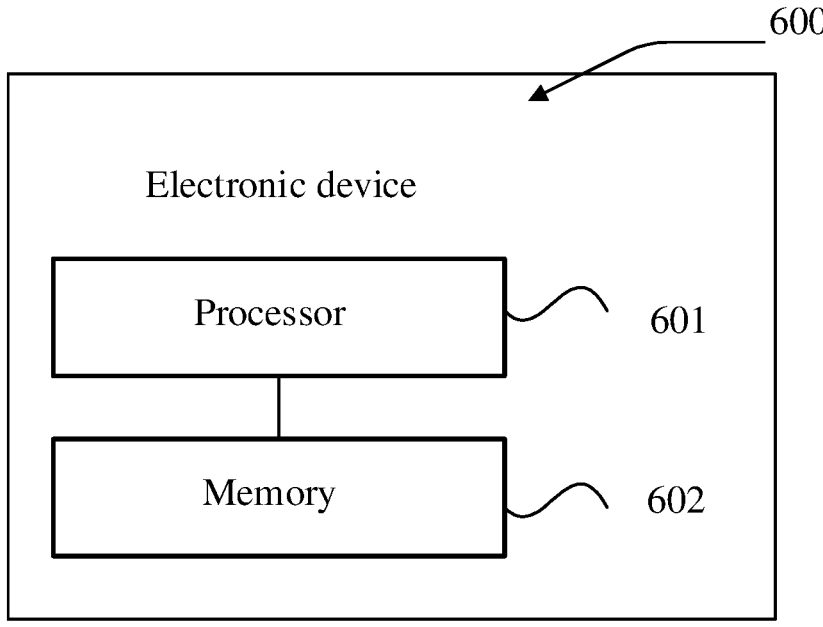
FIG. 6 is a schematic structural diagram of an electronic device 600 according to an embodiment of the present disclosure.

FIG. 6 is a schematic structural diagram of an electronic device 600 according to an embodiment of the present disclosure. The electronic device 600 may be provided as a terminal, and the electronic device 600 may vary greatly due to different configurations or performance, and may include one or more processors (for example, central processing units (CPU)) 601 and one or more memories 602. The memory 602 stores at least one instruction, and the at least one instruction is loaded and executed by the processor 601 to implement the following steps of the viewing angle adjustment method:

determining an adsorption area of a first virtual object according to a distance between the first virtual object and a second virtual object, the distance and a size of the adsorption area being positively correlated;

obtaining a target rotation speed of a viewing angle of a virtual scenario in a case that an aiming point of the second virtual object is located in the adsorption area; and adjusting the viewing angle of the virtual scenario according to the target rotation speed of the viewing angle.

In a possible implementation, the processor is further configured to perform the following steps:

detecting whether the virtual scenario includes the first virtual object;

performing the step of determining an adsorption area of a first virtual object according to a distance between the first virtual object and a second virtual object in a case that the virtual scenario includes the first virtual object; and obtaining a first preset rotation speed of the viewing angle of the virtual scenario in a case that the virtual scenario does not include the first virtual object.

In a possible implementation, the processor is configured to perform the following steps:

determine the size of the adsorption area of the first virtual object to be zero in a case that the distance is less than a first preset distance or the distance is greater than a second preset distance; and determine an area in a preset range around the first virtual object to be the adsorption area of the first virtual object in a case that the distance between the first virtual object and the second virtual object is greater than or equal to the first preset distance and less than or equal to the second preset distance, a size of the preset range and the distance being positively correlated.

In a possible implementation, the processor is configured to perform the following steps: obtaining a second preset rotation speed as the target rotation speed of the viewing angle of the virtual scenario in a case that the aiming point of the second virtual object is located in a first sub-area of the adsorption area, the second preset rotation speed being greater than a first preset rotation speed; and obtaining a third preset rotation speed as the target rotation speed of the viewing angle of the virtual scenario in a case that the aiming point of the second virtual object is located in a second sub-area of the adsorption area, the third preset rotation speed being less than the first preset rotation speed, where the first sub-area surrounds outside the second sub-area.

In a possible implementation, the processor is configured to perform the following steps:

obtaining a horizontal rotation speed and a vertical rotation speed of the viewing angle by decomposing the target rotation speed of the viewing angle according to a horizontal direction and a vertical direction; and adjusting the viewing angle of the virtual scenario according to the horizontal rotation speed only.

In a possible implementation, the processor is configured to perform the following step:

obtaining a fourth preset rotation speed as the target rotation speed of the viewing angle of the virtual scenario in a case that the aiming point of the second virtual object is located in a third sub-area of the adsorption area, the fourth preset rotation speed being less than the first preset rotation speed, where the second sub-area surrounds outside the third sub-area.

In a possible implementation, the processor is further configured to the following step: controlling the aiming point to move with the first virtual object in a case that the aiming point of the second virtual object is located in the adsorption area and the first virtual object has moved.

In a possible implementation, the processor is configured to perform the following steps:

calculating a movement distance of the aiming point of the second virtual object at a preset time interval according to the target rotation speed of the viewing angle;

calculating a rotation angle of the viewing angle of the virtual scenario at the preset time interval based on the movement distance and the distance between the first virtual object and the second virtual object; and adjusting the viewing angle of the virtual scenario every the preset time interval to rotate by the rotation angle.

In a possible implementation, the processor is further configured to perform the following steps:

adjusting, after a control operation in a viewing angle adjustment procedure is ended, the viewing angle of the virtual scenario according to a target rotation speed of a viewing angle at a moment before the control operation is ended within a preset time; and stopping adjusting the viewing angle of the virtual scenario in a case that the control operation is not detected within the preset time.

Certainly, the electronic device may further include components such as a wired or wireless network interface, a keyboard, and an input/output interface, to facilitate the input/output. The electronic device may further include another component configured to implement functions of a device, and details are not described herein again.

In an exemplary embodiment, a computer-readable storage medium storing a computer program, for example, a memory storing a computer program, is further provided. The computer program, when executed by a processor, implements the foregoing viewing angle adjustment method. For example, the computer-readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for obtaining a rotation speed for refreshing a virtual scenario, the method comprising:

determining, by a device comprising a memory storing instructions and a processor in communication with the memory, an absorption area of a target virtual object with respect to a virtual player in a virtual scenario;

in response to an aiming point of the virtual player being in the absorption area, obtaining, by the device, a rotation speed of a viewing angle for the virtual scenario for shooting the target virtual object in the virtual scenario, by:

in response to the aiming point being in a first sub-area of the absorption area, determining, by the device, a first rotation speed as the rotation speed of the viewing angle for the virtual scenario, and in response to the aiming point being in a second sub-area of the absorption area, determining, by the device, a second rotation speed as the rotation speed of the viewing angle for the virtual scenario, the second rotation speed being less than the first rotation speed, and the first sub-area surrounding the second sub-area of the absorption area; and refreshing, by the device, the virtual scenario based on the rotation speed of the viewing angle for the virtual scenario.

2. The method according to claim 1, wherein the determining the absorption area comprises:

determining, by the device based on a distance between the target virtual object and the virtual player, the absorption area of the target virtual object.

3. The method according to claim 2, wherein:

a size of the absorption area is positively correlated with the distance between the target virtual object and the virtual player.

4. The method according to claim 1, wherein the refreshing the virtual scenario comprises:

adjusting, by the device, the viewing angle of the virtual scenario according to the rotation speed of the viewing angle;

rendering, by the device, the virtual scenario based on the adjusted viewing angle; and displaying, by the device, the virtual scenario.

5. The method according to claim 4, wherein the adjusting the viewing angle comprises:

calculating, by the device, a movement distance of the aiming point of the virtual player at a time interval according to the rotation speed of the viewing angle;

calculating, by the device, a rotation angle of the viewing angle of the virtual scenario at the time interval based on the movement distance and the distance between the target virtual object and the virtual player; and adjusting, by the device, the viewing angle of the virtual scenario at every time interval to rotate by the rotation angle.

6. The method according to claim 4, wherein the adjusting the viewing angle comprises:

decomposing, by the device, the rotation speed of the viewing angle to obtain a horizontal rotation speed and a vertical rotation speed of the viewing angle according to a horizontal direction and a vertical direction; and adjusting, by the device, the viewing angle of the virtual scenario according to the horizontal rotation speed only.

7. The method according to claim 1, further comprising:

in response to the aiming point of the player being outside the absorption area, determining, by the device, a third rotation speed as the rotation speed of the viewing angle for the virtual scenario, wherein the third rotation speed is in a range from the second rotation speed to the first rotation speed.

8. A device for obtaining a rotation speed for refreshing a virtual scenario, comprising:

a memory storing instructions; and a processor in communication with the memory, wherein, when the processor executes the instructions, the processor is configured to cause the device to:

determine an absorption area of a target virtual object with respect to a virtual player in a virtual scenario;

in response to an aiming point of the virtual player being in the absorption area, obtain a rotation speed of a viewing angle for the virtual scenario for shooting the target virtual object in the virtual scenario, by:

in response to the aiming point being in a first sub-area of the absorption area, determining a first rotation speed as the rotation speed of the viewing angle for the virtual scenario, and in response to the aiming point being in a second sub-area of the absorption area, determining a second rotation speed as the rotation speed of the viewing angle for the virtual scenario, the second rotation speed being less than the first rotation speed, and the first sub-area surrounding the second sub-area of the absorption area; and refresh the virtual scenario based on the rotation speed of the viewing angle for the virtual scenario.

9. The device according to claim 8, wherein, when the processor is configured to cause the device to determine the absorption area, the processor is configured to cause the device to:

determine, based on a distance between the target virtual object and the virtual player, the absorption area of the target virtual object.

10. The device according to claim 9, wherein:

a size of the absorption area is positively correlated with the distance between the target virtual object and the virtual player.

11. The device according to claim 8, wherein, when the processor is configured to cause the device to refresh the virtual scenario, the processor is configured to cause the device to:

adjust the viewing angle of the virtual scenario according to the rotation speed of the viewing angle;

render the virtual scenario based on the adjusted viewing angle; and display the virtual scenario.

12. The device according to claim 11, wherein, when the processor is configured to cause the device to adjust the viewing angle, the processor is configured to cause the device to:

calculate a movement distance of the aiming point of the virtual player at a time interval according to the rotation speed of the viewing angle;

calculate a rotation angle of the viewing angle of the virtual scenario at the time interval based on the movement distance and the distance between the target virtual object and the virtual player; and adjust the viewing angle of the virtual scenario at every time interval to rotate by the rotation angle.

13. The device according to claim 11, wherein, when the processor is configured to cause the device to adjust the viewing angle, the processor is configured to cause the device to:

decompose the rotation speed of the viewing angle to obtain a horizontal rotation speed and a vertical rotation speed of the viewing angle according to a horizontal direction and a vertical direction; and adjust the viewing angle of the virtual scenario according to the horizontal rotation speed only.

14. The device according to claim 8, wherein, when the processor executes the instructions, the processor is configured to further cause the device to:

in response to the aiming point of the player being outside the absorption area, determine a third rotation speed as the rotation speed of the viewing angle for the virtual scenario, wherein the third rotation speed is in a range from the second rotation speed to the first rotation speed.

15. A non-transitory computer readable storage medium storing computer readable instructions, wherein, the computer readable instructions, when executed by a processor, are configured to cause the processor to:

determine an absorption area of a target virtual object with respect to a virtual player in a virtual scenario;

in response to an aiming point of the virtual player being in the absorption area, obtain a rotation speed of a viewing angle for the virtual scenario for shooting the target virtual object in the virtual scenario, by:

in response to the aiming point being in a first sub-area of the absorption area, determining a first rotation speed as the rotation speed of the viewing angle for the virtual scenario, and in response to the aiming point being in a second sub-area of the absorption area, determining a second rotation speed as the rotation speed of the viewing angle for the virtual scenario, the second rotation speed being less than the first rotation speed, and the first sub-area surrounding the second sub-area of the absorption area; and refresh the virtual scenario based on the rotation speed of the viewing angle for the virtual scenario.

16. The non-transitory computer readable storage medium according to claim 15, wherein, when the computer readable instructions are configured to cause the processor to determine the absorption area, the computer readable instructions are configured to cause the processor to:

determine, based on a distance between the target virtual object and the virtual player, the absorption area of the target virtual object.

17. The non-transitory computer readable storage medium according to claim 16, wherein:

a size of the absorption area is positively correlated with the distance between the target virtual object and the virtual player.

18. The non-transitory computer readable storage medium according to claim 15, wherein, when the computer readable instructions are configured to cause the processor to refresh the virtual scenario, the computer readable instructions are configured to cause the processor to:

adjust the viewing angle of the virtual scenario according to the rotation speed of the viewing angle;

render the virtual scenario based on the adjusted viewing angle; and display the virtual scenario.

19. The non-transitory computer readable storage medium according to claim 18, wherein, when the computer readable instructions are configured to cause the processor to adjust the viewing angle, the computer readable instructions are configured to cause the processor to:

calculate a movement distance of the aiming point of the virtual player at a time interval according to the rotation speed of the viewing angle;

calculate a rotation angle of the viewing angle of the virtual scenario at the time interval based on the movement distance and the distance between the target virtual object and the virtual player; and adjust the viewing angle of the virtual scenario at every time interval to rotate by the rotation angle.

20. The non-transitory computer readable storage medium according to claim 18, wherein, when the computer readable instructions are configured to cause the processor to adjust the viewing angle, the computer readable instructions are configured to cause the processor to:

decompose the rotation speed of the viewing angle to obtain a horizontal rotation speed and a vertical rotation speed of the viewing angle according to a horizontal direction and a vertical direction; and adjust the viewing angle of the virtual scenario according to the horizontal rotation speed only.

* * * * *